(12) United States Patent
Van Stiphout

(10) Patent No.: US 7,546,997 B2
(45) Date of Patent: Jun. 16, 2009

(54) FASTENING CONSTRUCTION, IN PARTICULAR FOR A WING MIRROR OF A MOTOR VEHICLE

(75) Inventor: Paulus Gerardus Maria Van Stiphout, Woerden (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 45 days.

(21) Appl. No.: 10/493,167

(22) PCT Filed: Oct. 30, 2002

(86) PCT No.: PCT/NL02/00689

§ 371 (c)(1),
(2), (4) Date: Sep. 28, 2004

(87) PCT Pub. No.: WO03/037680

PCT Pub. Date: May 8, 2003

(65) Prior Publication Data

US 2005/0103971 A1    May 19, 2005

(30) Foreign Application Priority Data

Oct. 30, 2001    (NL) .................................... 1019258

(51) Int. Cl.
*A47B 97/04*    (2006.01)
(52) U.S. Cl. ...................... 248/477; 248/476; 359/872; 359/841
(58) Field of Classification Search ................. 248/471, 248/477, 483, 478, 484, 476; 359/872, 874, 359/876, 879, 841; 403/349, 350, 351, 352, 403/353
See application file for complete search history.

(56) References Cited

U.S. PATENT DOCUMENTS

| 3,017,217 | A | * | 1/1962 | Keating | 296/97.13 |
| 4,789,232 | A | * | 12/1988 | Urbanek | 248/549 |
| 5,636,071 | A | * | 6/1997 | Mochizuki et al. | 359/877 |
| 6,022,113 | A | * | 2/2000 | Stolpe et al. | 359/841 |
| 6,130,514 | A | * | 10/2000 | Oesterholt et al. | 318/438 |
| 6,286,968 | B1 | * | 9/2001 | Sailer et al. | 359/872 |
| 6,322,221 | B1 | * | 11/2001 | van de Loo | 359/841 |
| 6,979,091 | B2 | * | 12/2005 | Ichikawa | 359/872 |
| 2002/0001148 | A1 | * | 1/2002 | Fuchs et al. | 359/872 |
| 2003/0218812 | A1 | * | 11/2003 | Foote et al. | 359/874 |

* cited by examiner

Primary Examiner—A. Joseph Wujciak, III
(74) Attorney, Agent, or Firm—Dykema Gossett PLLC

(57) ABSTRACT

A fastening construction, in particular for a wing mirror unit of a motor vehicle, comprising a base part (1) which can be fixedly connected with a vehicle, and a rotation part (3) which is arranged to be coupled with the base part (1) and which in coupled condition constitutes a central shaft for pivotally bearing-mounting a wing mirror unit. The base part (1) and the rotation part (3) are provided with at least one projection and groove pair (19, 20) cooperating as a bayonet catch, such that the rotation part (3) can be displaced towards the base part (1) and that when the projection and groove pair are in engagement, the rotation part (3) is pivotable about the geometric axis (2), and, after passing an intermediate angular position (13), through cooperation of the projection and groove pair (19, 20), the rotation part (3) is locked relative to the base part (1), axially along the geometric axis (2). The rotation part (3) and the base part (1) are further provided with blocking means (4, 6) which in a second angular position (5*b*) restrain the rotation part (3) from rotation relative to the base part (1) about the geometric axis (2).

23 Claims, 6 Drawing Sheets

FASTENING CONSTRUCTION, IN PARTICULAR FOR A WING MIRROR OF A MOTOR VEHICLE

TECHNICAL FIELD

This invention relates to a fastening construction, in particular for a wing mirror unit of a motor vehicle, comprising a base part which can be fixedly connected with an exterior of vehicle, and a rotation part which is adapted to be coupled with the base part and which in coupled condition constitutes a central shaft for pivotally bearing-mounting a housing of a wing mirror unit.

BACKGROUND OF THE INVENTION

Such a fastening construction is generally known and is often used for fixing a wing mirror unit to a motor vehicle.

It is customary to design wing mirrors of motor vehicles in such a manner that they can pivot towards the vehicle, for instance in case of a calamity, such as a collision, or to occupy less space in parked condition. The wing mirrors are then designed with a central shaft, which is fixedly connected with the exterior of vehicle and around which the housing for the wing mirror with the mirror glass and other provisions can rotate when a particular moment is exceeded.

Because mirror housings are mostly assembled separately and are mounted on the car as an assembly, the central shaft is often designed as a rotation part which can be coupled to a fixed part of the car, the base part.

This coupling can be carried out by connecting the rotation part with the base part using screws. The rotation part is then provided, for instance, with one or more holes which correspond with threaded holes in the base part. This solution has as a disadvantage that a large number of additional mounting operations are required, and that moreover per threaded hole an additional part is required: the screw.

It has been found that fitting the screws can lead to errors. In particular, it may be forgotten to fit screws and/or loose screws may remain behind in the mirror housing. In addition, the tightening force of screws is difficult to control. Also, the screws require additional mounting space, which may seriously hamper freedom in designing the mirror housing.

SUMMARY OF THE INVENTION

The invention contemplates a fastening construction of the type mentioned in the preamble, whereby the above-mentioned disadvantages can be avoided.

To that end, the fastening construction according to the invention is characterized in that the base part and the rotation part are provided with at least one projection and groove pair cooperating as a bayonet catch, such that in a first angular position of the rotation part relative to the base part, the rotation part, for the purpose of coupling, can be displaced along a geometric axis in an insertion direction towards the base part to bring the projection and groove pair into engagement and that when the projection and groove pair are in engagement, the rotation part is pivotable about the geometric axis from the first angular position to a second angular position, and wherein, after passing an intermediate angular position through cooperation of the projection and groove pair, the rotation part is locked relative to the base part, axially along the geometric axis, at least in a direction opposite to the insertion direction, and that the rotation part and the base part are further provided with cooperating blocking means which in the second angular position lock the rotation part against rotation relative to the base part about the geometric axis.

By connecting the rotation part via a bayonet catch with the base part, in a first fastening step the rotation part, for the purpose of coupling, can be displaced along a geometric axis to the base part to bring the projection and groove pairs into engagement. Next, when projection and groove pairs are in engagement, in a second fastening step, the rotation part can be pivoted about the geometric axis from the first angular position, via an intermediate angular position, to a second angular position. After passing the intermediate angular position, through cooperation of the projection and groove pairs, the rotation part is then locked relative to the base part, axially along the geometric axis.

The effect achieved in that the rotation part and the base part are further provided with cooperating blocking means is that it is no longer possible simply to rotate the rotation part back from the second angular position to the first angular position, so that undesired uncoupling of rotation part and base part can be avoided. A blocking part is then preferably designed as a detachable lock, so that uncoupling remains possible. Of course, it is also possible to make the lock of undetachable design, so that a permanent coupling between rotation part and base part is achieved.

Preferably, the rotation part is provided with a bearing part which, together with a bearing chamber in the base part, constitutes a bayonet catch. The effect thus achieved is that in the second angular position a stable, axial and radial fixation between rotation part and base part is possible.

By embodying one blocking part of the cooperating blocking means in a separate component, the fastening operations can be simplified and the stability of the coupling can be further improved. In an elegant manner, the blocking part is then connected with the rotation part so as to be translatable along the geometric axis. The blocking part can then cooperate with the projection guide under spring action, but can naturally also cooperate in a different manner, for instance through gravity. Preferably, the blocking part is then attached to the rotation part so as to be restrained from rotation relative to the geometric axis.

In a particularly advantageous manner, the blocking part is further provided with angle limiting means for limiting the rotation angle of a housing of a wing mirror unit, which housing is bearing-mounted for pivotal motion about the rotation part. As a result, the construction of the wing mirror unit can be made of compact design.

Further advantageous embodiments of the invention are set forth in the subclaims.

The invention further relates to a wing mirror unit for an exterior of motor vehicle and to a method for fastening a wing mirror unit to an exterior of motor vehicle.

BRIEF DESCRIPTION OF THE DRAWINGS

The invention will be further elucidated on the basis of an exemplary embodiment which is represented in the drawing. In the drawing.

DETAILED DESCRIPTION OF THE EMBODIMENTS

Figure 1:
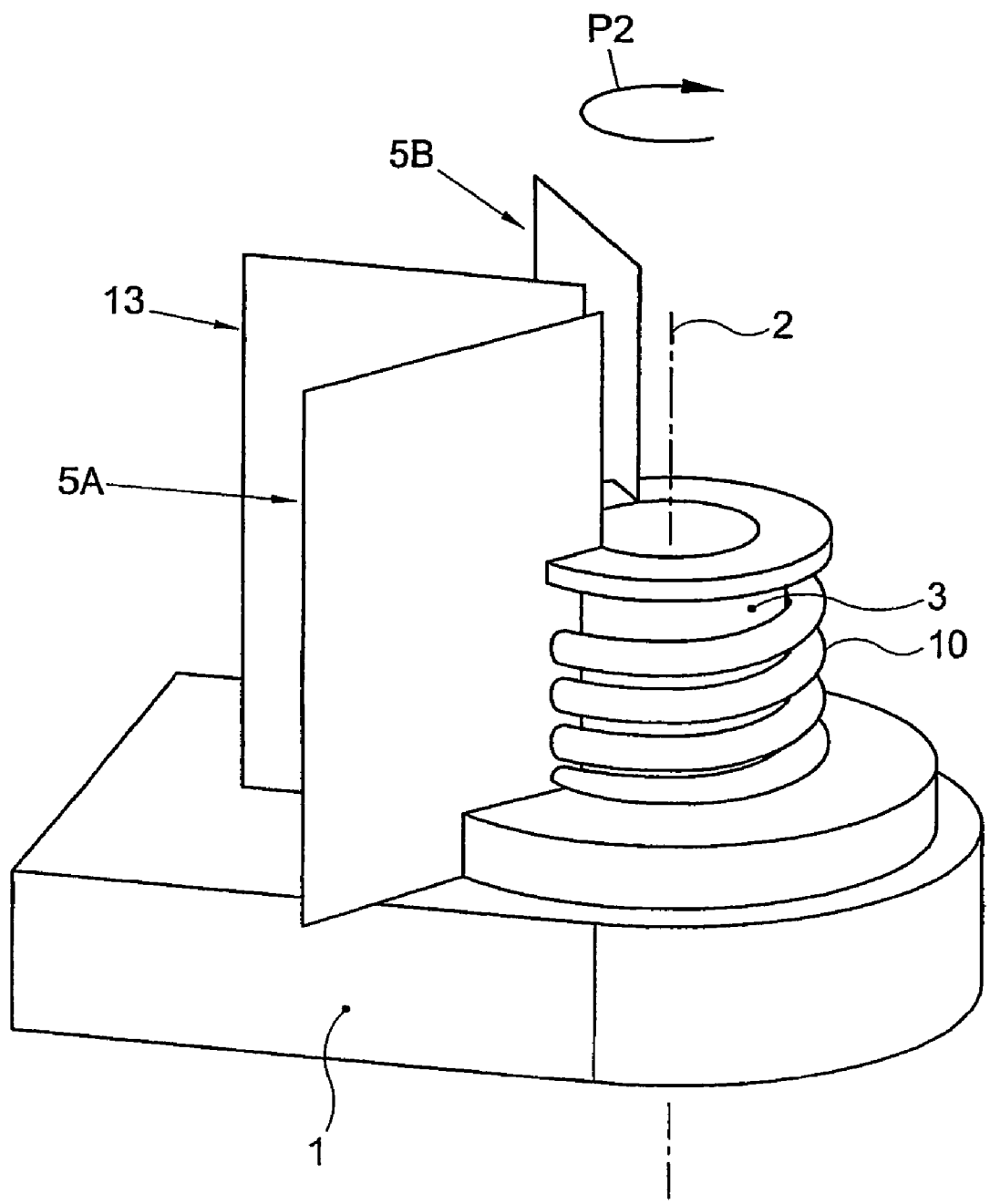
FIG. 1 is a schematic perspective side elevation of a first embodiment of the fastening construction in coupled condition.
Figure 2:
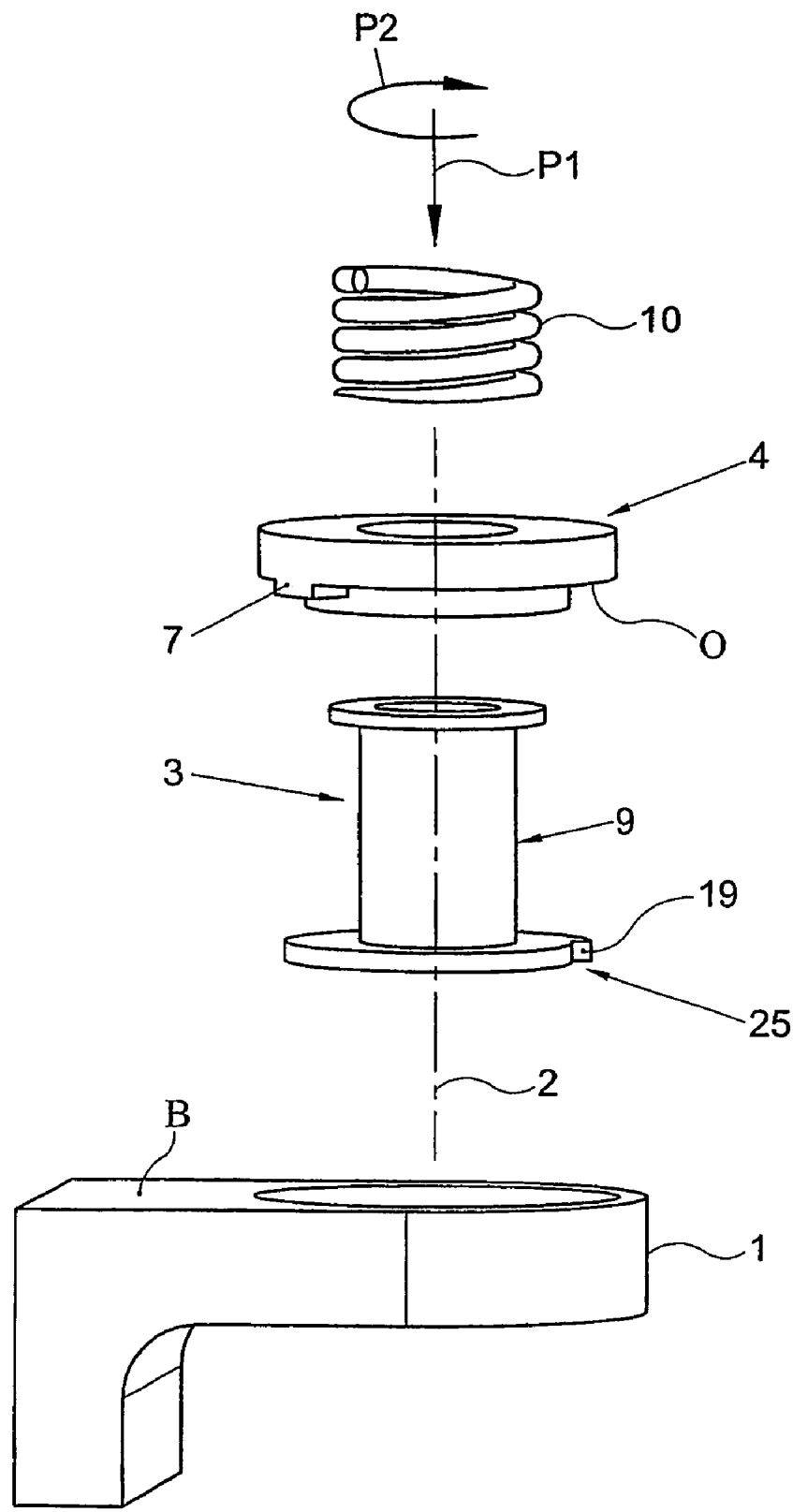
FIG. 2 is a schematic perspective side elevation of a fastening construction of FIG. 1 in disassembled condition.
Figure 3:
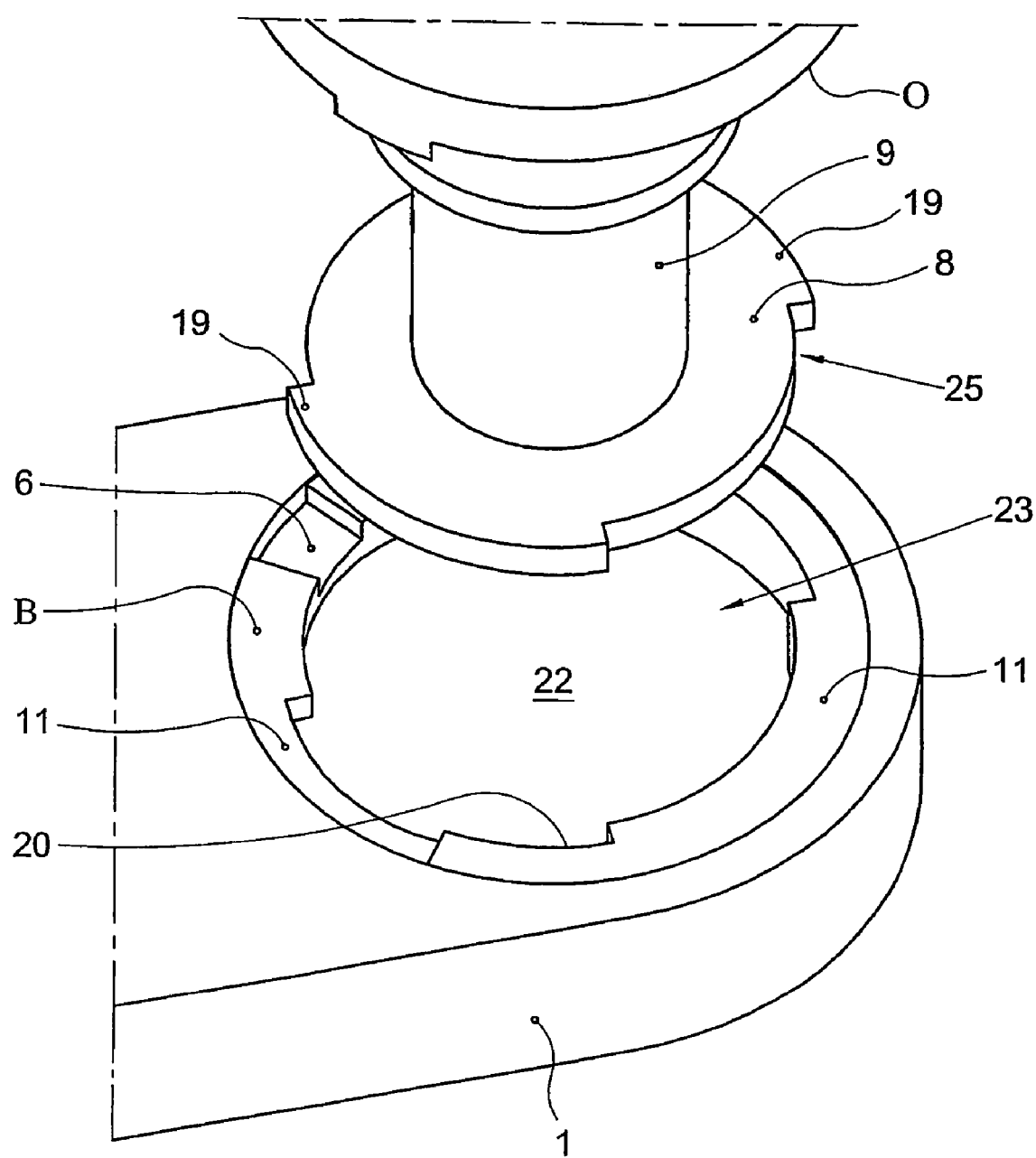
FIG. 3 is a schematic perspective detailed view of the base part and the rotation part of FIG. 2.
Figure 4:
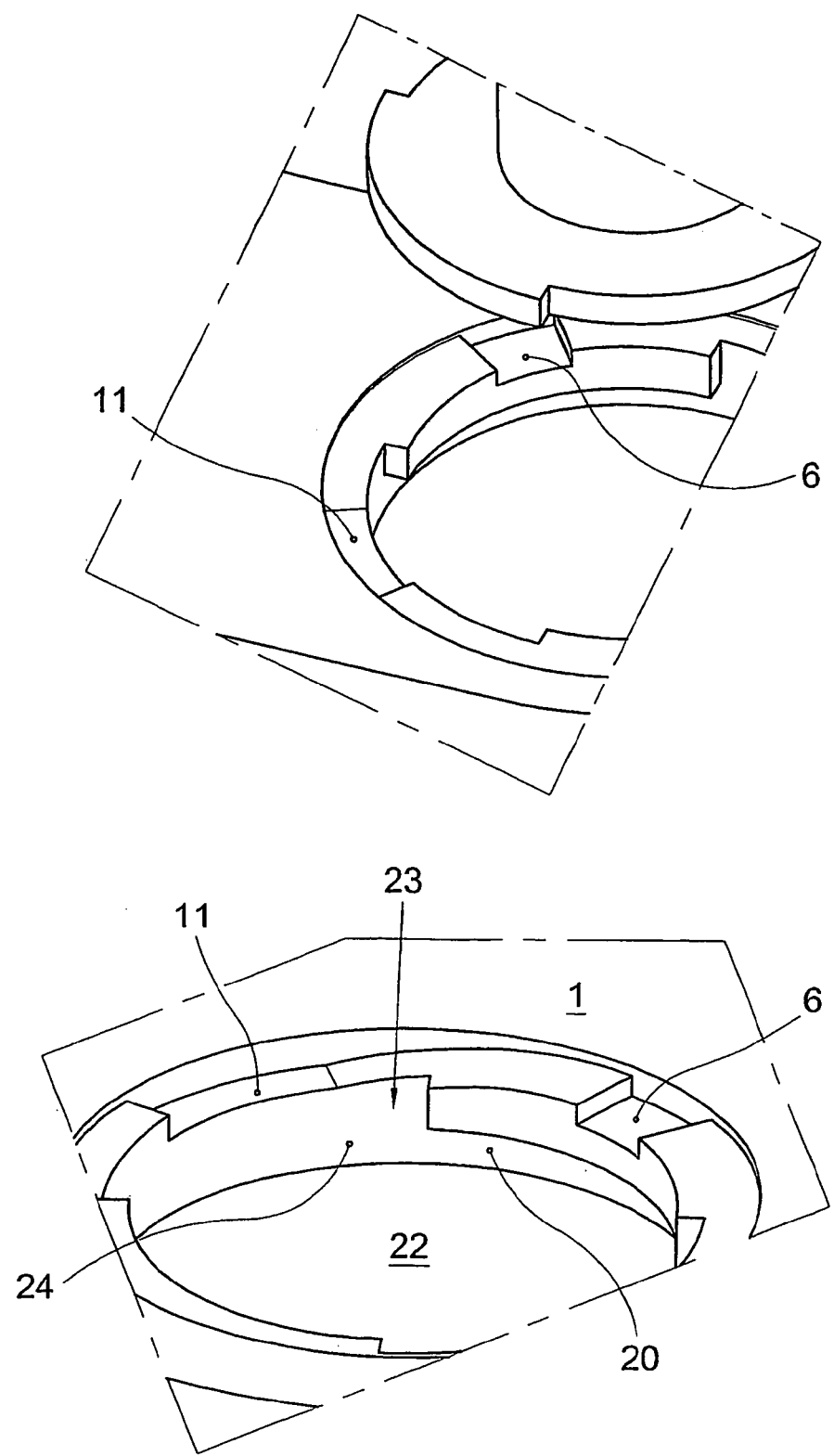
FIG. 4 is an enlarged perspective view of the base part and the rotation part of FIG. 3.

The figures only concern schematic representations of preferred embodiments of the invention. In the figures, the same or corresponding parts are designated by the same reference numerals.

In FIGS. 1-4, a first embodiment of a fastening construction is shown for a wing mirror unit (not shown) of a motor vehicle. The fastening construction comprises a base part 1 and a rotation part 3. The base part 1 can be fixedly connected with the vehicle. The rotation part 3 is arranged to be coupled with base part 1 and, in coupled condition, constitutes a central shaft, such that the housing of a wing mirror unit can be bearing-mounted for pivotal movement around it.

The rotation part 3 is provided with a main shaft part 9 which extends along a geometric axis 2. The rotation part 3 is further provided with a bearing part 25 which extends substantially radially relative to the geometric axis 2. The bearing part 25 is designed as a bearing plate 8 which is provided with outwardly reaching projections 19 and which fits into a bearing chamber 22 in the base part 1. This chamber 22 is provided with an opening 23 corresponding with the bearing plate 8, which opening 23 links up with an annular undercut 24 extending around the geometric axis 2, which undercut 24 defines a number of arcuate grooves 20 for the projections. The projections 19 and the grooves 20 together form a bayonet catch. The height of the bearing chamber 22 preferably corresponds to the thickness of the bearing plate 8, but may also be chosen to be greater.

In a first angular position 5a of the rotation part 3 relative to the base part 1, the rotation part 3 can be displaced along a geometric axis 2 in the direction of the arrow P1 in an insertion direction towards the base part 1, such that groove 20 and projection 19 enter into engagement. During pivoting about the geometric axis 2 from the first angular position 5a via an intermediate angular position 13 to a second angular position 5b in the direction of the arrow P2, the rotation part 3 after passing an intermediate angular position 13 is fixed with respect to the base part 1 in axial direction, at least in a direction opposite to the insertion direction, through cooperation of the grooves 20 and projections 19.

The rotation part 3 and the base part 1 are provided with cooperating blocking means 4, 6 which in the second angular position 5b fix the rotation part 3 as regards rotation relative to the base 1 about the geometric axis 2. The cooperating blocking means 4, 6 comprise a blocking part 4 on the rotation part 3 which cooperates with a stop 6 on the base part 1. The blocking part 4 and the rotation part 3 are rigidly coupled as regards rotation about the geometric axis 2. The stop 6 and the base part 1 are likewise rigidly coupled as regards rotation relative to the geometric axis 2.

The stop 6 is designed as a recess included in a guide track 11 at a position corresponding to the second angular position 5b. The blocking part 4 comprises a guide projection 7 which cooperates with the guide track 11.

In particular, the rotation part 3 carries an annular blocking part 4 which is located around the main shaft part 9 of the rotation part 3. The blocking part 4 can slide axially along the geometric axis 2 relative to the rotation part 3, but cannot rotate about said axis 2 relative to rotation part 3, for instance through form-closure of the blocking part 4 around the main shaft part 9. The blocking part 4 is provided with a guide projection 7. The base part 1 comprises a guide track 11 with a recess 6, such that cooperation of base part 1 and blocking part 4 locks the rotation part 3 in the second angular position 5b against rotation with respect to the base 1 about the geometric axis 2.

A biased volute spring 10 which surrounds the main shaft part 9 presses the blocking part 4, and hence the guide projection 7, on the guide track 11 and, in the second angular position 5b, in the recess 6.

In this first preferred embodiment, the guide track 11 with recesses 6 is provided adjacent the top surface B of the base part 1. The blocking part 4, in disassembled condition, extends over, or at an intermediate distance along, the bearing plate 8 of the rotation part 3, while the projection 7 is situated at least partly on the undersurface at the bottom side of the blocking part 4 that lies clear from the bearing plate 8.

When coupling the rotation part 3 with the base part 1, in a first fastening step the rotation part is moved in the insertion direction P1 along the geometric axis 2 towards the base part 1 to bring the projection and groove, pairs 19, 20 into engagement. As a result, the projection 7 enters into engagement with the guide track. Next, when projection and groove pairs 19, 20 are in engagement, in a second fastening step, the rotation part 3 is pivoted, for instance in the direction of the arrow P2 or in the opposite direction, about the geometric axis 2 from the first angular position 5a to the second angular position 5b. After passing an intermediate angular position 13, through cooperation of the projection and groove pairs 19, 20, the rotation part 3 is locked axially along the geometric axis 2 with respect to the base part 1 in a direction opposite to the insertion direction. At the same time, the projection 7 of the blocking part cooperates with a run-on surface 26 of the guide track 11. Upon rotation of the rotation part 3 from angular position 5a to angular position 5b, the volute spring 10 is compressed to an increasing extent, until in the second angular position the projection 7 slides into the recess 6 and thereby blocks rotation of the rotation part 3 with respect to the base part 1. The bias force which the spring 10 exerts on the blocking part 4 thereby runs up from an initial value and upon blocking decreases to a value greater than or equal to the initial value.

Figure 5:
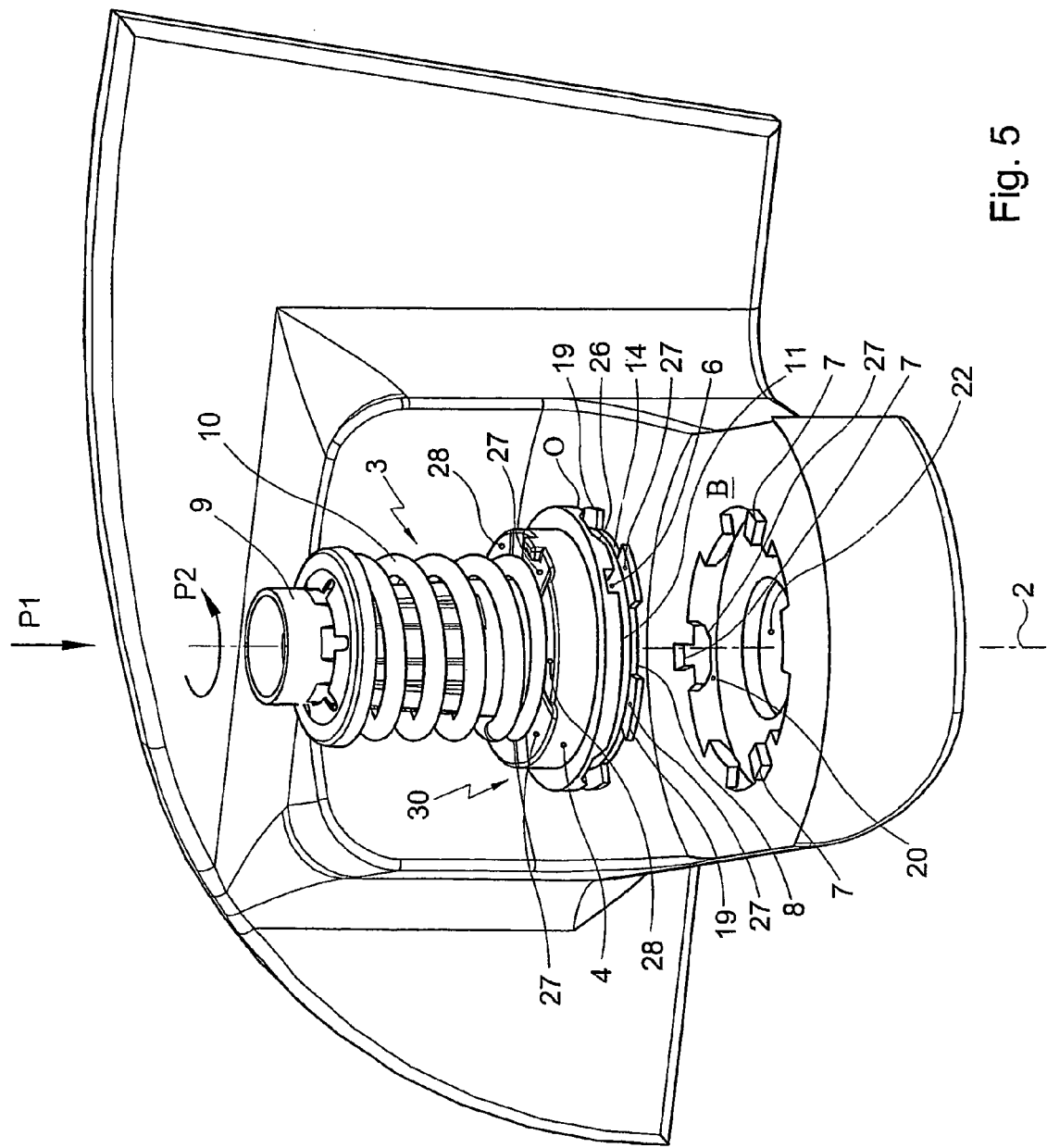
FIG. 5 is a schematic perspective side elevation of a second embodiment of a fastening construction in uncoupled condition.
Figure 6:
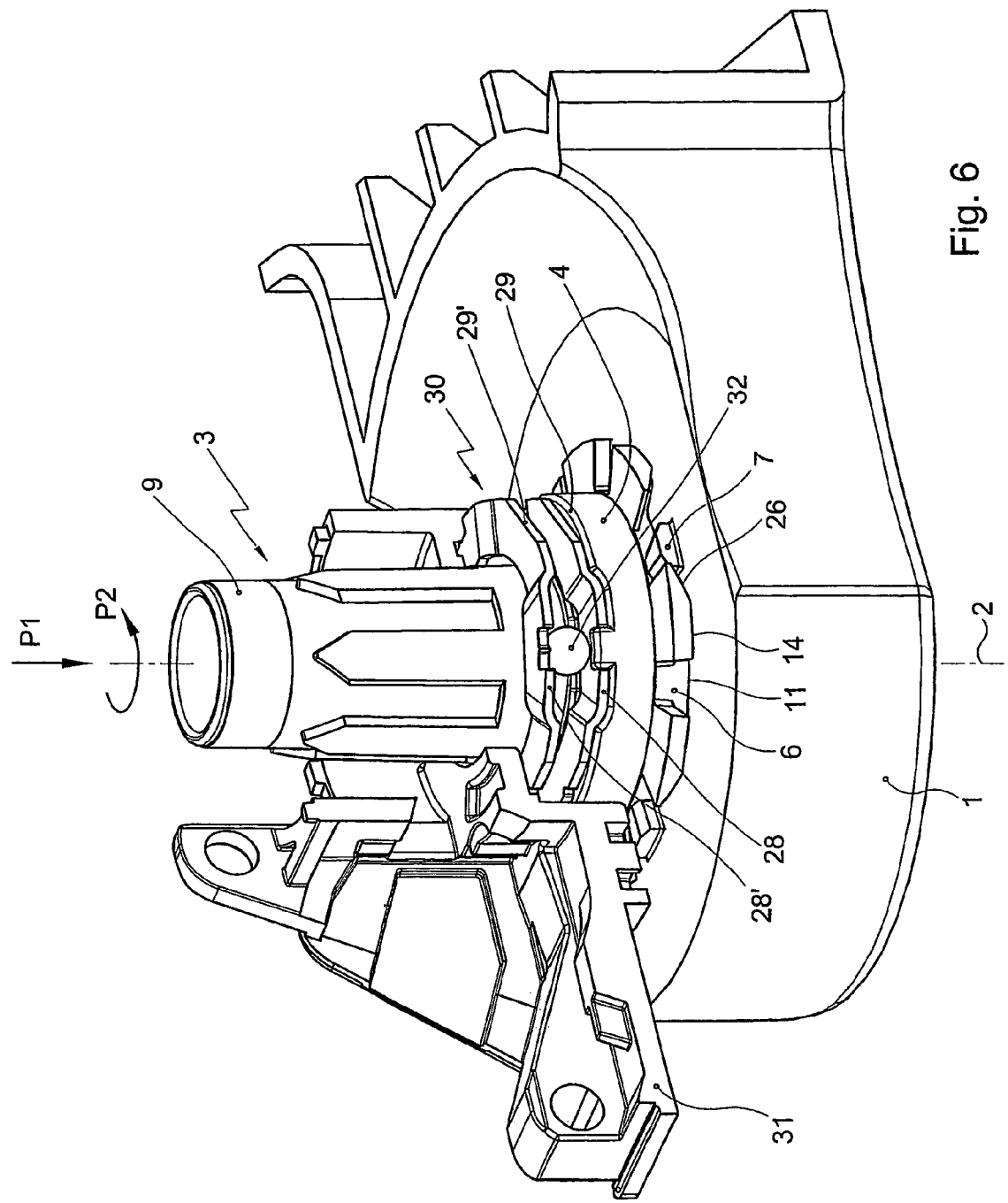
FIG. 6 is a schematic perspective side elevation of the fastening construction of FIG. 5 in coupled condition and provided with a housing of a wing mirror unit, bearing-mounted around the rotation part.

In a second embodiment of the invention, represented in FIGS. 5 and 6, the guide track 11 is arranged on the blocking part 4, the guide projection 7 being arranged on the base part 1.

The guide track 11 is provided with a further recess 12, the first recess 6 and further (second) recess 12 being located at equal positions along the geometric axis 2, that is, at the same height in the figures. The projection 7 on the blocking part 4, in the first angular position 5a, engages in this second recess 12, so that the first coupling step can easily be automated. The second recess 12 has an open side which bounds a part of the guide track 11 which extends between the first and second recess 6, 12 and which forms an intermediate guide track 14 which comprises the run-on surface 26.

In this embodiment, the bayonet catch is designed with a plurality of projections 19 and grooves 20. To enhance the axial fixation between the rotation part 3 and the base part 1 in coupled condition, the projections 19 and/or the grooves 20 in this embodiment are provided with clamping surfaces 27 which cooperate in or adjacent to the second angular position 5b.

The blocking part 4 is further provided with angle limiting means 30 for limiting the rotation angle of a housing 31 of a wing mirror unit, bearing-mounted pivotally around the rotation part 3.

The housing 31 is pivotable about the geometric axis 2 between an operating position, in which the housing 31 projects substantially sidewards relative to the body of the car, and an extreme fold-in position, in which the housing 31 extends substantially rearwards along the body of the car. As a result, the housing 31, for instance during parking, can be folded in from the operating position, so that the free end of the housing 31 comes to lie closer to the body of the car and the risk of damage can be reduced.

To enable the rotation limited between the fold-in position and the operating position, the housing 31 and the blocking part 4 are designed as hinge parts of a hinge construction, and angle limiting means 30 are included between the blocking part 4 and the housing 1.

The angle limiting means 30 are here designed as two guide tracks between which guide elements 32, designed as balls, are displaceably received. On the blocking part 4, the guide track is designed as a further guide track 28 and, linking up therewith, an auxiliary guide track 29, while the housing 1 is provided with a corresponding guide track 28' and an auxiliary guide track 29'.

When folding out to the operating position, the hinge parts 4, 31 pivot relative to each other, and the guide elements 32 are guided through the guides 28, 28' until they each abut against a track end of the guide, so that the rotation angle is limited. When folding in from the operating position, the guide elements 32 are guided in the opposite direction over the guide tracks 28, 28', until a stop corresponding to the extreme fold-in position has been reached.

It is noted that the guide elements 32 in this exemplary embodiment are designed as loose guide elements 32 received in two guide tracks 28, 28' between the blocking part 4 and the housing 31. Naturally, it is also possible to design the angle limiting means 30 with guide elements fixedly connected with one of the hinge parts 4, 31, for instance as projections fixedly carried on one hinge part 4, 31, which projections cooperate with only one guide track on the other part 4, 31.

For the sake of safety, it has been elected to design the hinge construction such that furthermore the mirror housing, from the operating position, can be pivoted further about the rotation axis, so that the mirror housing can be folded over from the operating position to an extreme fold-over position in which the mirror housing extends substantially forwards along the body of the car.

To that end, the hinge parts 4, 31 are subject, in axial direction, to spring action of the spring 10, so that the hinge parts, from the operating position, can be pivoted further in that the guide elements 32 adjacent the track ends run out of the guide tracks 28, 28' and the hinge parts are pressed apart in axial direction, against the spring force. Upon further pivoting into the extreme fold-out position, the guide elements are guided over the auxiliary guide tracks 29, 29'. In this manner, when an obstacle hits the mirror housing 31, the mirror housing can pivot along about the rotation axis in the direction of travel, so that the chance of damage to the mirror housing and/or the obstacle can be reduced.

The invention is not limited to the exemplary embodiments represented here.

In particular, the fastening construction can be provided with a driving mechanism to adjust the housing 31 electrically, and the projection and groove pair of the bayonet catch can be designed in a variety of ways. In addition, the features mentioned in the description can be combined in various ways to yield other embodiments.

These and other variations will be clear to the skilled person and are understood to fall within the scope of the invention as represented in the following claims.

The invention claimed is:

1. A fastening construction supports a wing mirror unit of an exterior vehicle, the fastening construction comprising a base part which is configured to be fixedly connected with said exterior vehicle, and a rotation part which is arranged to be coupled with the base part and wherein the rotation part is a central shaft for pivotally bearing-mounting a housing of a wing mirror unit, wherein the base part and the rotation part are provided with at least one projection and groove pair cooperating as a bayonet catch, such that in a first angular position of the rotation part relative to the base part, the rotation part, for the purpose of coupling, can be displaced along a geometric axis in an insertion direction towards the base part to bring the projection and groove pair into engagement and that when the projection and groove pair are in engagement, the rotation part is pivotable about the geometric axis from the first angular position to a second angular position, and wherein, after passing an intermediate angular position, through cooperation of the projection and groove pair, the rotation part is locked relative to the base part, axially along the geometric axis, at least in a direction opposite to the insertion direction, and that the rotation part and the base part are further provided with cooperating blocking member which in the second angular position restrain the rotation part from rotation relative to the base part about the geometric axis, wherein the cooperating blocking member comprise a blocking part which cooperates with a stop provided at a point corresponding to the second angular position, wherein the blocking part is embodied in a component separate from the rotation part and wherein the blocking part is attached to the rotation part so as to be axially movable relative to the geometric axis and restrained from rotation relative to the rotation part; and wherein the blocking part and the rotation part are rotation-coupled relative to the geometric axis, and wherein further the stop and the base part are rotation-coupled relative to the geometric axis.

2. A fastening construction according to claim 1, wherein the stop is configured as a recess included in a guide track at a point corresponding to the second angular position, and wherein the blocking part comprises a guide projection which cooperates with the guide track.

3. A fastening construction according to claim 2, wherein the guide track comprises one further recess which is included in the guide track at a point corresponding to the first angular position.

4. A fastening construction according to claim 3, wherein the first recess and the further recess are situated at an equal position along the geometric axis.

5. A fastening construction according to claim 2, wherein the guide track is provided with a run-on surface.

6. A fastening construction according to claim 5, wherein the run-on surface forms part of an intermediate guide track extending between a first recess and a further recess.

7. A fastening construction according to claim 1, wherein the base part has a chamber, and wherein the rotation part has a main shaft part extending along the geometric axis, and a bearing part extending substantially radially with respect to the geometric axis, for bearing-mounting in the chamber.

8. A fastening construction according to claim 7, wherein the bearing part together with the chamber constitutes the bayonet catch and wherein the blocking part is embodied in a separate component.

9. A fastening construction according to claim 7, wherein the blocking part is further provided with angle limiting means for limiting the rotation angle of a housing of a wing mirror unit, which housing is bearing-mounted so as to be pivotable about the rotation part.

10. A fastening construction according to claim 9, wherein the angle limiting means comprise a further guide track having an auxiliary guide track linking up therewith, which further guide track and auxiliary guide track are located at different positions along the geometric axis.

11. A fastening construction according to claim 7, wherein the bearing part is a substantially disc-shaped bearing plate which is provided at its circumference with outwardly reaching projections and wherein the chamber is provided with an access opening which extends along the geometric axis and which has been given a shape corresponding to the bearing plate, which access opening links up with an annular undercut extending around the geometric axis, which undercut defines a number of arcuate grooves for the projections.

12. A fastening construction according to claim 7, wherein the blocking part on a side proximal to the bearing part carries a guide projection or guide track.

13. A fastening construction according to claim 7, wherein the blocking part is biased through a spring along the geometric axis towards the bearing part.

14. A fastening construction according to claim 1, wherein the blocking part is annular.

15. A fastening construction according to claim 1, wherein the blocking part is movable relative to the rotation part, axially along the geometric axis.

16. A fastening construction according to claim 15, wherein the blocking part is situated around the main shaft part of the rotation part.

17. A fastening construction according to claim 1, wherein projection and groove pair are provided, at least in or adjacent the second angular position, with cooperating clamping surfaces.

18. A fastening construction according to claim 1, provided with a housing, bearing-mounted around the rotation part, for a wing mirror.

19. A fastening construction according to claim 1, wherein the rotation part has a main shaft part that is non-threaded.

20. A fastening construction according to claim 1, wherein the stop is disposed on the base part.

21. A fastening construction according to claim 1, wherein the blocking part is embodied in a component separate from the rotation part.

22. A wing mirror unit for a motor vehicle, comprising a housing with a mirror glass, further comprising a base part which is configured to be connected with an exterior portion of said motor vehicle, and a rotation part which is arranged to be coupled with the base part and which in and wherein the rotation part is a central shaft for the housing which is pivotable about the rotation part, while the base part and the rotation part are provided with at least one projection and groove pair cooperating as a bayonet catch, such that in a first angular position of the rotation part relative to the base part, the rotation part for the purpose of coupling, can be displaced along a geometric axis in an insertion direction towards the base part to bring the projection and groove pair into engagement and that when the projection and groove pair are in engagement, the rotation part is pivotable about the geometric axis from the first angular position to a second angular position, and wherein, after passing an intermediate angular position, through cooperation of the projection and groove pair, the rotation part is locked relative to the base part, axially along the geometric axis, at least in a direction opposite to the insertion direction, and wherein the rotation part and the base part are further provided with cooperating blocking member which in the second angular position restrain the rotation part from rotation relative to the base part about the geometric axis, wherein the cooperating blocking member comprise a blocking part which cooperates with a stop on the base part,
  wherein the blocking part is embodied in a separate component from the rotation part and wherein the blocking part is attached to the rotation part so as to be axially movable relative to the geometric axis and restrained from rotation relative to the rotation part.

23. A wing mirror unit according to claim 22, wherein the blocking part is further provided with angle limiting means for limiting the rotation angle of the housing bearing-mounted for pivotal motion around the rotation part.

* * * * *